W. C. SHARP.
Curtain-Fixture.
No. 215,484.    Patented May 20, 1879.
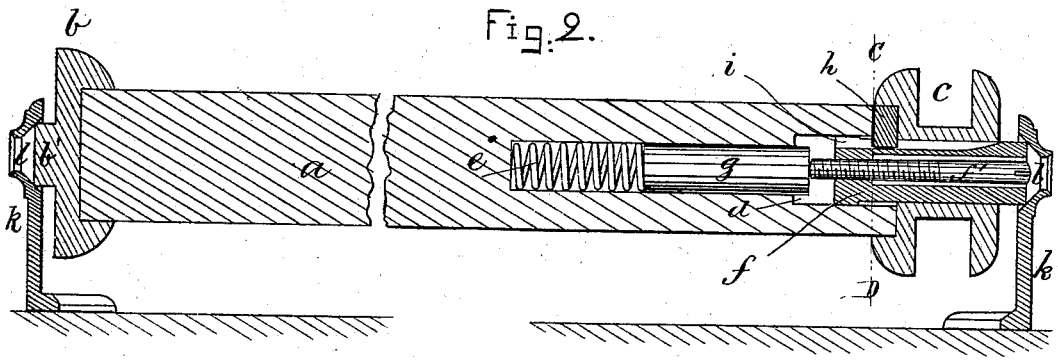
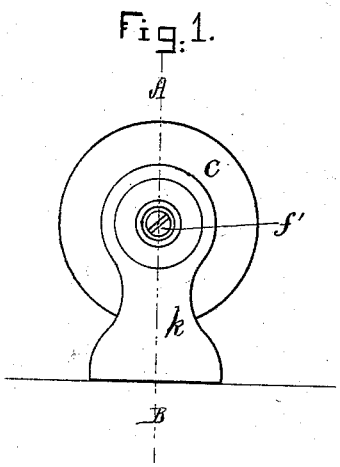
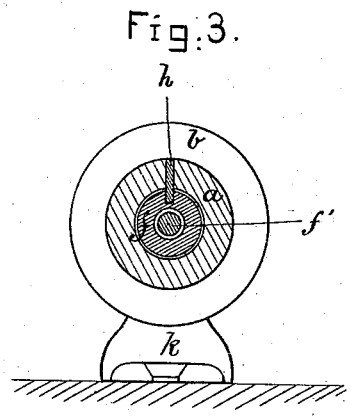
Witnesses.
Henry Chadbourn
F. Allen
Inventor.
William C. Sharp
by
Alban Andrews
his atty.

UNITED STATES PATENT OFFICE.

WILLIAM C. SHARP, OF BOSTON, MASSACHUSETTS.

IMPROVEMENT IN CURTAIN-FIXTURES.

Specification forming part of Letters Patent No. 215,484, dated May 20, 1879; application filed February 15, 1879.

*To all whom it may concern:*

Be it known that I, WILLIAM C. SHARP, of Boston, in the county of Suffolk and State of Massachusetts, have invented certain new and and useful Improvements in Curtain-Fixtures; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in curtain-fixtures; and this my invention consists in the combination, with a hollow curtain-roller provided with a coiled spring and movable pin or spindle, of improved bearings for the spindle and projecting part of the cap of the roller to rotate in, said bearings being made with a tapering or concave hole, by which the advantage is secured that the spindle ends of the roller will always find a true bearing-surface to run in, no matter whether the bearing or brackets should be secured at a right angle to the axis of the roller or not; and, moreover, by so constructing the bearings no side play whatever of the roller will occur, as all the wear and tear of the spindle ends are automatically taken up by the longitudinally-adjustable spindle being forced by the pressure of the usual coiled spring into the concave or tapering hole in the bracket.

In that end of the roller where the cord-pulley is located is made the usual central and cylindrical recess in which the adjustable spindle is located, and automatically forced against the bearing by means of the usual coiled spring, so as to obtain the necessary friction between the spindle end and its bearing.

For the purpose of adjusting the amount of such friction according to different weights of curtains, I provide the spindle with a central adjustable screw resting in a screw-threaded central perforation within the adjustable spindle, the inner end of which screw rests against a cylindrical piece or washer interposed between the coiled spring and the said screw within the cylindrical bore of the roller.

In this manner I am able to increase or decrease the pressure of the coiled spring, and consequently to increase or decrease the friction between the spindle end and its tapering bearing, simply by turning the adjusting-screw a little to the right or left, as may be desired.

The adjustable spindle is prevented from turning around its axis independent of the roller by means of a small peg or projection in the internal bore in the roller playing into a longitudinal groove or recess made on the external part of the adjustable spindle, and in this manner the frictional resistance is obtained between the spindle end and its tapering or concave bearing instead of between the external surface of the spindle and the internal part of the cylindrical bore within the roller, as heretofore has been the case, the latter being objectionable, as it soon wears out the spindle and internal part of the roller, and thereby makes the curtain-roller wabble or run unsteady. The opposite end of the curtain-roller is provided with a cap, as usual, the central external part of which projects as a short cylindrical spindle long enough to allow the spindle to project within its tapering bearing without letting the face of the cap come in contact with the bracket, and thus I am enabled to dispense with the usual leather or other washer interposed between the cap and the bracket for obtaining frictional resistance.

On the accompanying drawings, Figure 1 represents an end view of my improved curtain-fixture. Fig. 2 represents a central longitudinal section on the line A B, shown in Fig. 1; and Fig. 3 represents a cross-section on the line C D, shown in Fig. 2.

Similar letters refer to similar parts wherever they occur on the different parts of the drawings.

$a$ is the curtain-roller, as usual; $b$, its cap, with its short cylindrical spindle $b'$, as set forth. $c$ is the cord-pulley, attached to the end of the roller $a$ in the usual manner. $d$ is the central cylindrical bore within the roller, and $e$ is the coiled frictional spring. $f$ is the longitudinally-adjustable spindle, and $f'$ is the adjustable screw, as and for the purpose set forth. $g$ is a piece of wood or other material interposed between the coiled spring $e$ and the adjustable screw $f'$, as described. $h$ is the peg or projection attached to the roller $a$ within the bore $d$, and $i$ is the groove on the external part of the spindle $f$, into which it plays, as and for the purpose set forth. $k\,k$ are the two brackets, having each a tapering or concave hole, $l$, in which the spindle ends $b'$ and $f$ rotate, as and for the purpose described.

What I wish to secure by Letters Patent, and claim, is—

1. In combination with the roller $a$, its coiled spring, $e$, and movable pin or spindle $f$, the brackets $k\,k$, having tapering or concave holes or bearings $l\,l$, as and for the purpose set forth and described.

2. In combination with the roller $a$ and its spring $e$, the adjustable spindle $f$, with its adjusting-screw $f'$, as and for the purpose described.

3. In combination, the roller $a$, spring $e$, projection $h$, adjustable spindle $f$, screw $f'$, and groove $i$, as and for the purpose set forth.

In testimony that I claim the foregoing as my own invention I have affixed my signature in presence of two witnesses.

WILLIAM C. SHARP.

Witnesses:
ALBAN ANDRÉN,
HENRY CHADBOURN.